(12) United States Patent
Kappler et al.

(10) Patent No.: US 12,093,094 B1
(45) Date of Patent: Sep. 17, 2024

(54) ENERGY FLOW INTEGRATION FOR A PREDICTIVE VIRTUAL THERMAL SENSOR

(71) Applicant: META PLATFORMS TECHNOLOGIES, LLC, Menlo Park, CA (US)

(72) Inventors: Christopher Jon Kappler, Lexington, MA (US); Ryan Fleming, Oakland, CA (US); Ray C. He, Menlo Park, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 283 days.

(21) Appl. No.: 17/681,611

(22) Filed: Feb. 25, 2022

Related U.S. Application Data

(60) Provisional application No. 63/213,482, filed on Jun. 22, 2021.

(51) Int. Cl.
*G06F 1/28* (2006.01)
*G06F 1/20* (2006.01)
*H02J 7/00* (2006.01)

(52) U.S. Cl.
CPC .............. *G06F 1/206* (2013.01); *G06F 1/203* (2013.01); *G06F 1/28* (2013.01); *H02J 7/0063* (2013.01)

(58) Field of Classification Search
None
See application file for complete search history.

(56) References Cited

U.S. PATENT DOCUMENTS

2014/0062669 A1* 3/2014 Mena ................ H04W 52/0216
340/10.5
2017/0030364 A1* 2/2017 Young ..................... G06F 1/206
2018/0329465 A1* 11/2018 Tavakoli ............... G06F 1/3234

* cited by examiner

*Primary Examiner* — Paul Yen
(74) *Attorney, Agent, or Firm* — Greenberg Traurig, LLP

(57) ABSTRACT

The disclosed computer-implemented method may include detecting an amount of energy being discharged from a battery of a computing device. The method may further include predicting, based on the amount of energy being discharged from the battery, a thermal response of the computing device. Furthermore, the method may include performing thermal management of the computing device based on the predicted thermal response. Various other methods, systems, and computer-readable media are also disclosed.

20 Claims, 14 Drawing Sheets

ENERGY FLOW INTEGRATION FOR A PREDICTIVE VIRTUAL THERMAL SENSOR

CROSS-REFERENCE TO RELATED APPLICATIONS

This application claims priority to and the benefit of U.S. Provisional Patent Application No. 63/213,482, filed on Jun. 22, 2021, which application is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
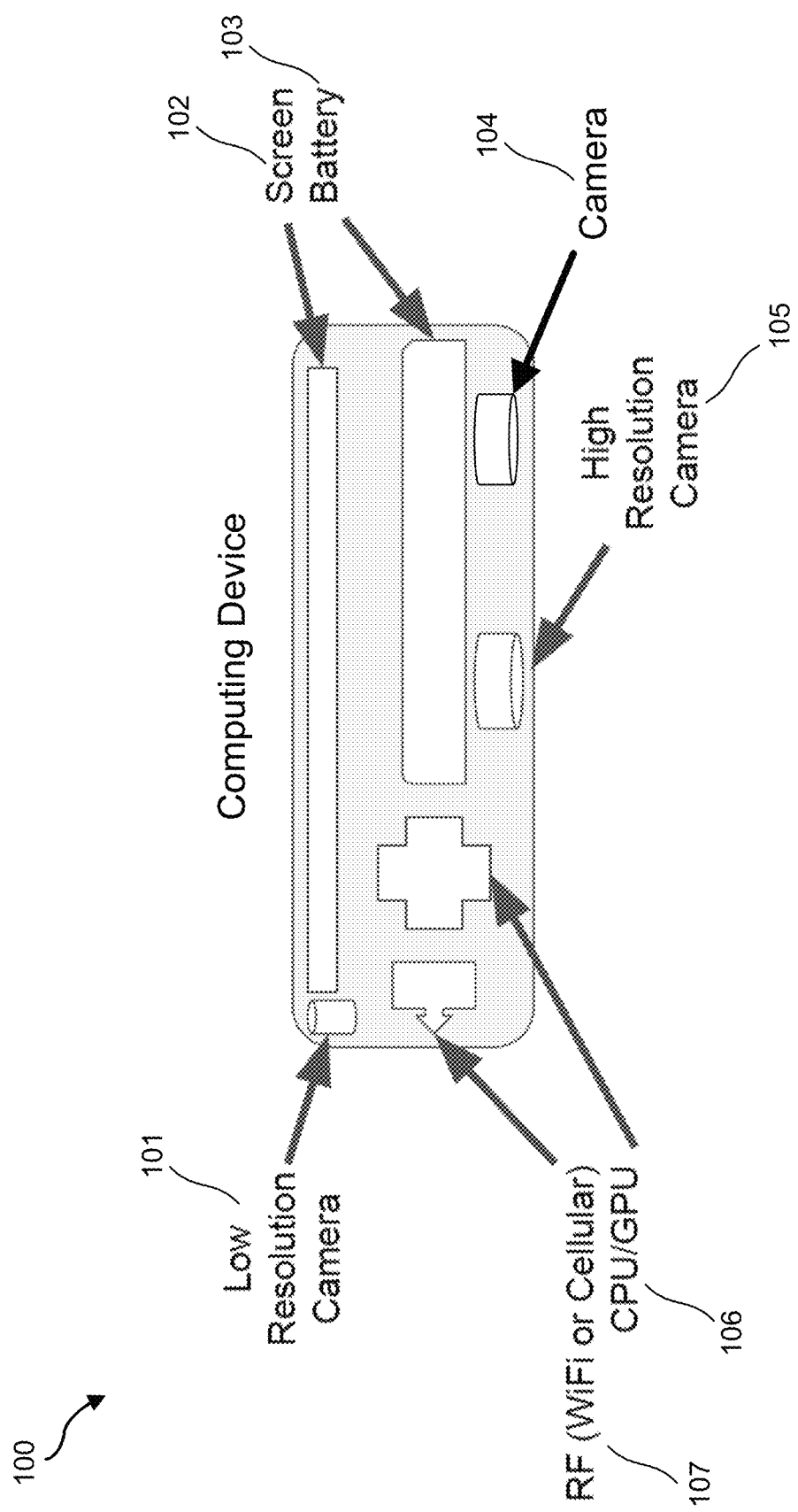
FIG. 1 is a diagram of heat sources and energy emitters in a computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Handheld and wearable devices conventionally use internal temperature sensors to protect the electronics from overheating and to protect the user from discomfort or possible burns. As illustrated in FIG. 1, a device 100, which may be a computing device such as an artificial reality device or other handheld or wearable device, may include various components (e.g., one or more cameras 101, 104, or 105, a screen 102, a battery 103, a wireless transmitter 107, one or more processors 106, etc.) that are sources of heat or otherwise emit energy. By their nature, internal temperature sensors report on the instantaneous temperature at one point inside the device. However, such measurement may not provide any direct indication of how much heating or cooling will occur in other parts of the device. In addition, because internal temperature sensors report temperatures that are already measurable, it may be difficult to do complex heat planning. Moreover, any active computation carried out by the main system processor will consume power, thus altering the temperature and battery life of the device. It is therefore of crucial importance to maintain the strictest economy of computation used for passive activities like temperature management.

Figure 2:
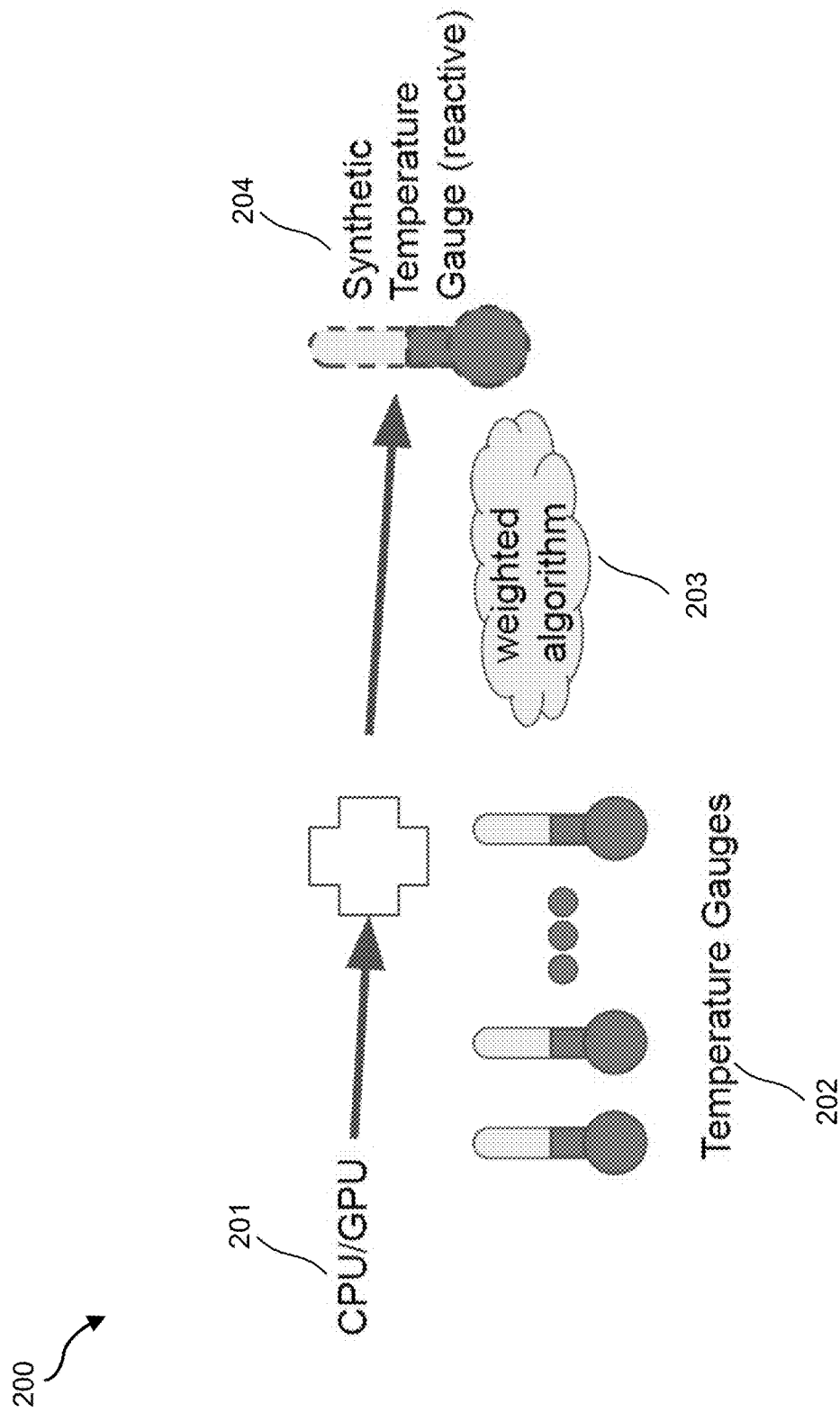
FIG. 2 is a diagram of reactive estimation of operational temperature of a device by sampling internal points.

As illustrated in FIG. 2, one conventional approach to predicting surface temperature of a computing device is to use multiple on-device temperature sensors 202 (e.g., for sampling internal points of a device substrate) and fit a curve to correlate to surface temperature. This approach may require running a large number of tests on many units, on all relevant use-cases, and across all ambient conditions. With this large dataset, linear-regression techniques may be used to create an equation 203 to calculate the surface temperature. The thermal response may be inherently nonlinear, which this approach may not capture, so accuracy may be limited to narrow regions. The current estimator (e.g., CPU/GPU 201) may use a weighted average of three thermistor outputs, one in the quiet area of the board, one near the modem model, and one on the power management integrated circuit. The weightings are determined through measurement. The formula applied may be (750*quiet_therm+750*msm_therm−500*pmic_therm−15000000)/1000.

Conventional virtual thermal sensors within kernel drivers may estimate temperature using weighted linear combinations of multiple real sensors or by applying a min or max function to the output of the multiple real sensors. In the case where a weighted average is chosen, the provided inputs may include the sensor zones, coefficients to multiply each sensor zone measurement, an offset to apply to the output, and a denominator to divide the output. However, these estimators (e.g., 204) may only capture existing states as a first order approximation and have no sense of historical state or rates of change.

The present disclosure is generally directed to accurately predicting the internal and external temperature of a computing device by integrating cumulative energy flow into and out of the various device components. As will be explained in greater detail below, embodiments of the present disclosure may use data provided by dedicated accumulators such as charge-counting accumulators that may be built into modern battery hardware and transmit byte counters that may be common on wireless interfaces.

Figure 3:
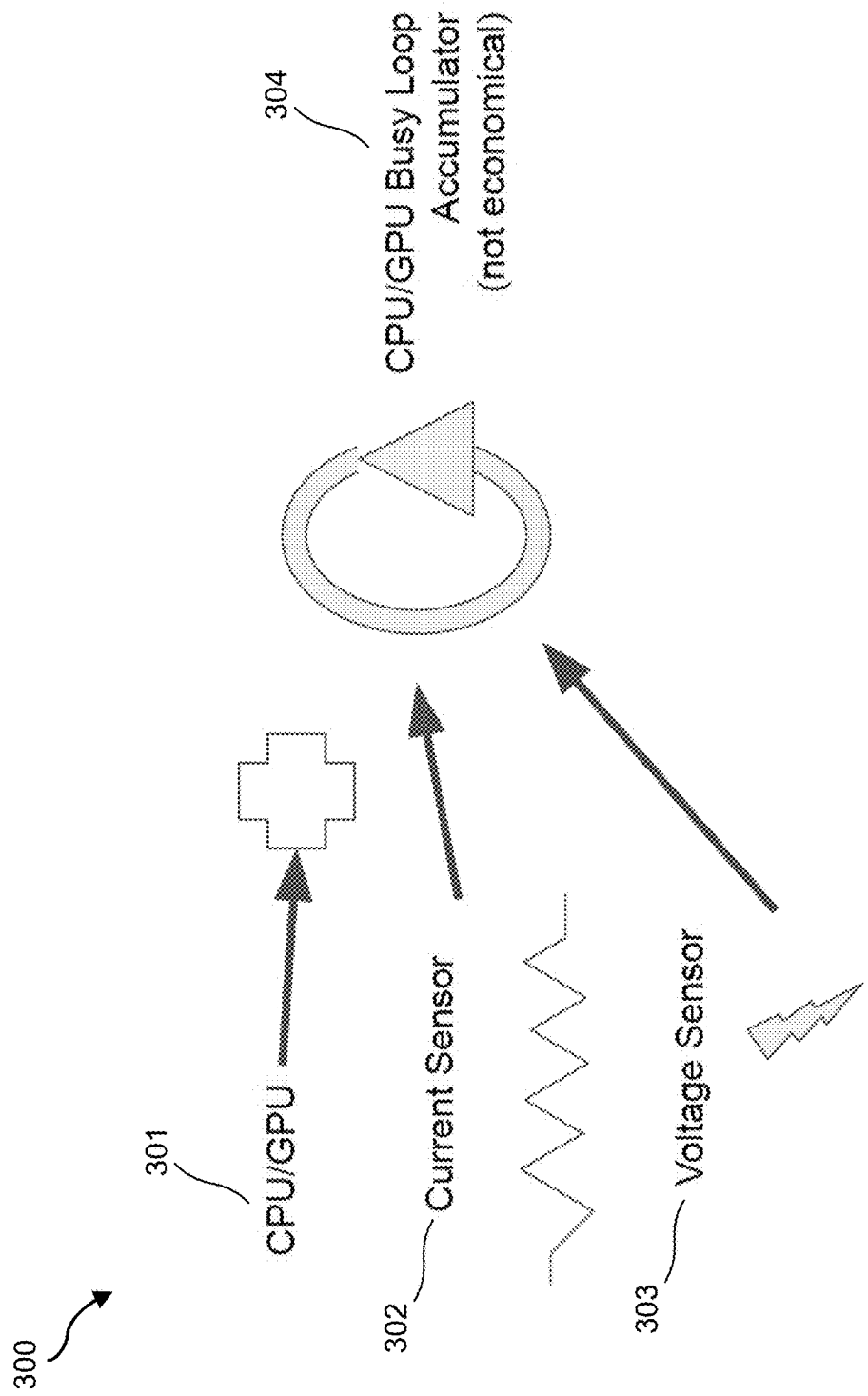
FIG. 3 is a diagram of accumulation of rapidly changing values in software.

FIG. 3 illustrates a system 300 that may include a CPU/GPU 301, a current sensor 302, and a voltage sensor 303 running on an accumulator busy loop 304 for collecting data. From this data, the flow of energy may be tracked through the device as it is transformed to heat, light, and radio waves. By relying on cumulative rather than instantaneous values, an economical accounting can be done for the net heat that is entering the device during a given interval of time. The corresponding rise or fall in the device's temperature thus yields a secondary estimate of the heat transfer out of the device and into the ambient environment.

In addition, the always-on nature of the accumulator circuit in the battery may eliminate or reduce the need for any frequent software wakeups for performing this mathematical integral of current over time. Thus, the systems and methods described herein may be more economical than other means of obtaining the same information. Furthermore, since the thermal response over time is a function of energy, systems and methods described herein may be able to anticipate temperature changes, which may allow much more sophisticated thermal management of a device based on its ambient conditions, its thermal headroom, its RF signal-to-noise conditions, etc.

Figure 4:
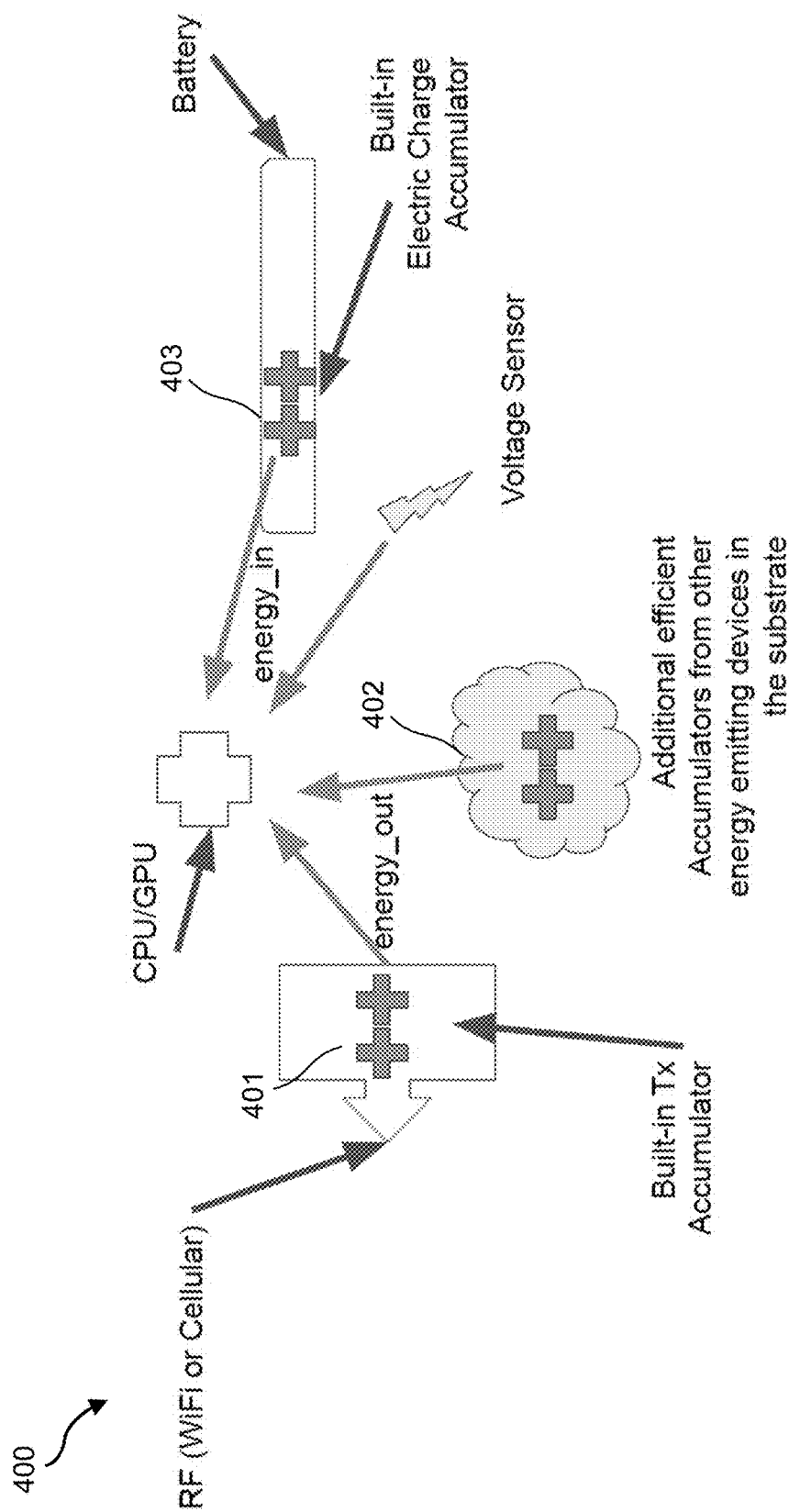
FIG. 4 is a diagram of energy transfer calculation from built-in accumulators in a transmitter and battery.

FIG. 4 illustrates an exemplary system 400 for calculating a device's thermal response using one or more accumulators 401, 402, and/or 403. System 400 may represent an operating environment of a computing device, such as a handheld or wearable device. As will be explained further below, a CPU/GPU may account for energy entering system 400 (e.g., energy_in) and energy leaving system 400 (e.g., energy_out). Energy may enter system 400 via a battery or other power source, which may be measured by a built-in electric charge accumulator and/or a voltage sensor. Energy may leave system 400 as wireless signals (e.g., RF such as WiFi and/or cellular signals), which may be measured by a built-in transmission accumulator, or energy emitted by other components, which may be measured by other accumulators.

In some examples, a software algorithm may wake with some interval time_w and estimate the energy entering the device from the battery as:

Battery_avg_voltage=(battery_voltage_at(previous_time)+battery_voltage_at(current_time))/2    Equation 1

Electric_charge_moved=battery_charge_count_at(current_time)−battery_charge_count_at(previous_time)    Equation 2

Energy_into_electronics=Electric_charge_moved*Battery_avg_voltage    Equation 3

The battery voltage may refer to an electric potential between a battery's poles. The battery's electric charge may be measured by a fuel gauge, which may refer to a circuit often included in battery hardware includes a charge counter to accumulate Coulombs (e.g., a unit of charge) or mAh (e.g., a unit of charge equal to 3.6 Coulombs) of charge that have flowed from one pole of the battery to the other During the same interval time_w, the RF energy estimated to have left the device may be calculated as:

RF_bytes_transmitted=(rf_bytes_transmitted_at(current_time)−rf_bytes_transmitted_at(previous_time))    Equation 4

Energy_out=RF_bytes_transmitted*(rf_efficiency(signal_to_noise_ratio,interface,bit_rate)    Equation 5

A battery may generate heat based on internal characteristics, including the battery's internal resistance. Studies show that internal resistance varies slightly with state-of-charge, but more significantly with age and number of recharge cycles e.g. health and with temperature of the battery. The heat generated by the internal workings of the battery may be estimated as follows:

Battery_avg_current=Electric_charge_moved/(current_time−previous_time)    Equation 6

Battery_internal_resistance=battery_rint_look_up_table[Battery_percent_drain,Battery_health,Battery_temperature]    Equation 7

Voltage_drop_internal_to_battery=Battery_avg_current*Battery_internal_resistance    Equation 8

Battery_heat_energy=Voltage_drop_internal_to_battery*Electric_charge_moved    Equation 9

The total energy that should turn into heat may therefore be calculated as Energy_in −Energy_out. The final factor to be estimated may be the rate at which heat is dissipated to the ambient environment.

Energy_in=Energy_into_electronics+Battery_heat_energy    Equation 10

Worst_case_temperature_rise=(Energy_in −Energy_out)*Cp*Mass    Equation 11

Degrees_of_cooling=previous_device_temperature+Worst_case_temperature_rise−current_device_temperature    Equation 12

Ambient_heat_energy_out=Degrees_of_cooling/Cp/Mass    Equation 13

Ambient_heat_dissipation=Ambient_heat_energy_out/(current_time−previous_time)    Equation 14

Specific heat capacity, or Cp, of a substance or substrate may refer to how many Joules (e.g., a unit of energy for heating one gram of water by 1 degree Celsius) are needed to heat one gram of the substance or substrate by 1 degree Celsius. Energy transfer or power may be measured in watts (e.g., one Joule per second).

The present disclosure further provides theoretical background and details on the execution of a 1-dimensional, transient thermal model, according to disclosed embodiments. This model enable may enable studying the thermal response of a device as a function of use-case and time. The model may require knowledge of the initial and steady-state temperature of each thermal node, as well as the thermal time constant. All of these variables must be calibrated to either test data or high-fidelity simulation data.

There are many forms of modeling to project the thermal response of devices, ranging from single-node 1D models to high-fidelity 3D Finite Element/Volume models based on the Naiver-Stokes and Heat Equations consisting of millions of nodes. Although the thermal design of many products may be primarily based on the latter, simplified models may enable rapid calculations, increasing the solution space that may be evaluated.

Figure 5:
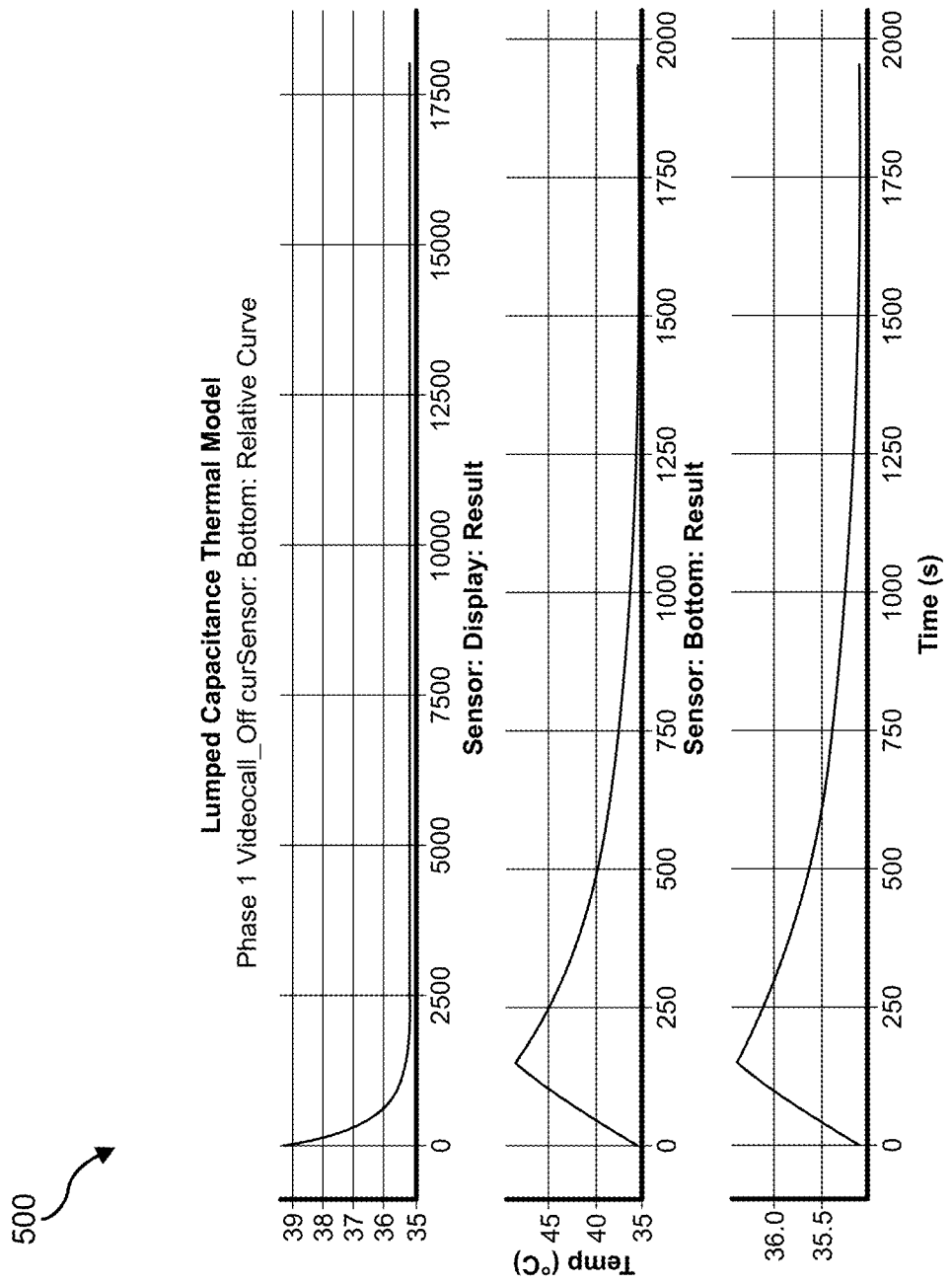
FIG. 5 is a graph of temperature for a lumped capacitance thermal model.

Disclosed herein is a single-node, lumped capacitance thermal model. The term lumped capacitance may refer to a node (e.g., a lump of material) having a sufficiently small thermal gradient so as to be considered iso-thermal. To ensure this assumption is true, a complex system must be broken into small-enough segments for the isothermal assumption to be a reasonable approximation. FIG. 5 illustrates a graph 500 of sample temperature readings over time for two lumps, display and bottom, for an example use case scenario of a video call.

A standard analytical technique to calculate the thermal response of a system may be to define a control volume ("CV") around the component of interest. This may be helpful to identify all sources or energy to ensure conservation, which may include heat passing through the CV, heat generated within the CV, as well as heat that is stored.

$$E_{in} - E_{out} = E_{st} - E_{gen} \quad \text{Equation 15}$$

Figure 6:
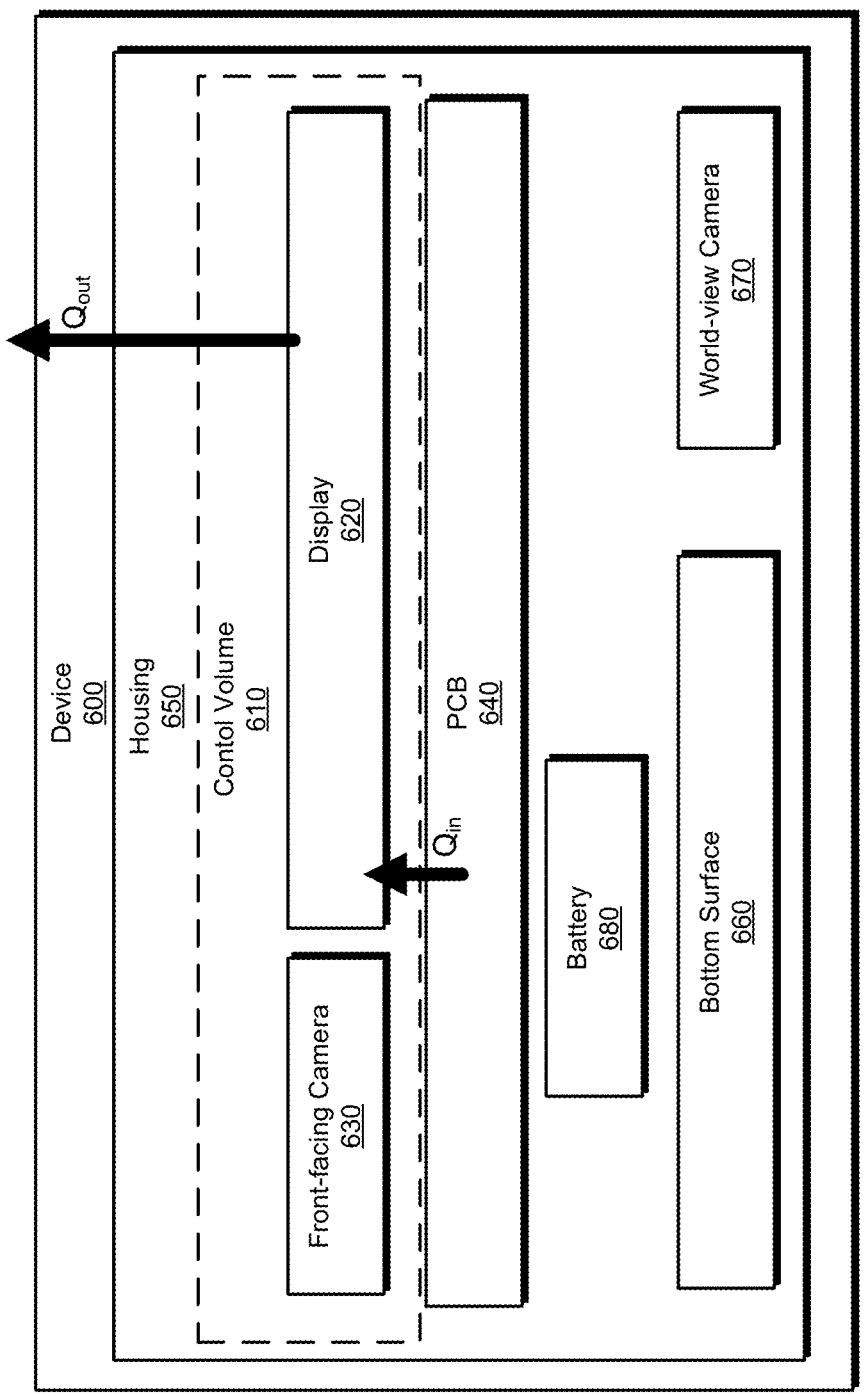
FIG. 6 is a diagram of an exemplary device according to embodiments of the present disclosure.

FIG. 6 illustrates a wearable device 600 with a control volume or CV 610 drawn around a display 620. As seen in FIG. 6, device 600 may include additional components, such as a front-facing camera 630, a single printed circuit board ("PCB") 640 with top-facing components, a housing 650 (which may be stainless steel or another durable material), a bottom surface 660 (which may be plastic or another durable material), a world-view camera 670, and a battery 680. Battery 680 may act both as a heatsink for PCB 640 as well as an insulator from heat dissipating into a user's wrist or skin. In the example illustrated in FIG. 6, CV 610 may include at least display 620.

For this model, each component of interest, such as the display, battery, cameras, and SOC, may be calculated independently. This model may not account for how each of these components interact with each other. To account for this physical effect, a higher-resolution model—either 2D or 3D—may be required. To overcome this deficiency, the 1D model may be calibrated to either test data or a high-fidelity model.

To simplify the math and model, heat-sources, both internal and external to the thermal node, may not be modeled. This will impact the thermal response if there are in fact heat sources, which is most-likely always going to be the case. To resolve this simplification, the 1D model may be calibrated to either test or high-fidelity simulation data.

$$-hA(T_s - T_\infty) = \rho V c_p \frac{dT}{dt} \quad \text{Equation 16}$$

Another simplification available is to introduce a new variable to account for the temperature difference between the surface and external environment:

$$\theta = T_s - T_\infty \quad \text{Equation 17}$$

The energy equation can now be rebalanced to the following:

$$-dt = \frac{\rho V c_p}{hA} \frac{d\theta}{\theta} \quad \text{Equation 18}$$

Integrating by separation of variable leads to the following expression:

$$-\int_0^t dt = \frac{\rho V c}{hA} \int_{\theta_i}^\theta \frac{d\theta}{\theta} \quad \text{Equation 19}$$

Where:

$$\theta_i = T_i - T_\infty \quad \text{Equation 20}$$

Integrating this equation results in:

$$-t = \frac{\rho V c}{hA} \ln\left(\frac{\theta_i}{\theta}\right) \quad \text{Equation 21}$$

Further rearrangement allows for solving temperature as a decaying exponential:

$$\frac{\theta}{\theta_i} = \frac{T - T_\infty}{T_i - T_\infty} = \exp\left[-\left(\frac{hA}{\rho V c}\right)t\right] \quad \text{Equation 22}$$

The previous equation may lead to a fundamental quality of thermal solids, which may explain the rate at which the temperature decays to a steady-state temperature. This temperature is often the temperature of the surrounding environment, but in this model may be based on empirical data. The non-dimensions quantity, t, may be defined at the thermal time constant and may be a function of the rate of heat dissipation as well as the effective heat capacity:

$$\tau = \frac{\rho V c_p}{hA} = RC \quad \text{Equation 23}$$

Where R is the thermal resistance to convection, radiation, and conduction, and C is the effective heat capacity. For a part that meets lumped capacity criteria, which is a function of the Biot number (e.g., the ratio of the convective resistance to the conductive resistance), R and C may be calculated knowing the material properties and dimensions. For this model, these parameters may not be known and instead may be calibrated to empirical data.

The thermal model may solve for the temperature of a single point by re-arranging the above equation to the following:

$$T = T_{ss} + (T_0 - T_{ss}) * e^{-\frac{t}{\tau}} \quad \text{Equation 24}$$

Where $T_0$ is the initial temperature, $T_{ss}$ is a steady-state temperature, t is the thermal time constant that may be calibrated to test or simulation data, and t is time in seconds.

Figure 7:
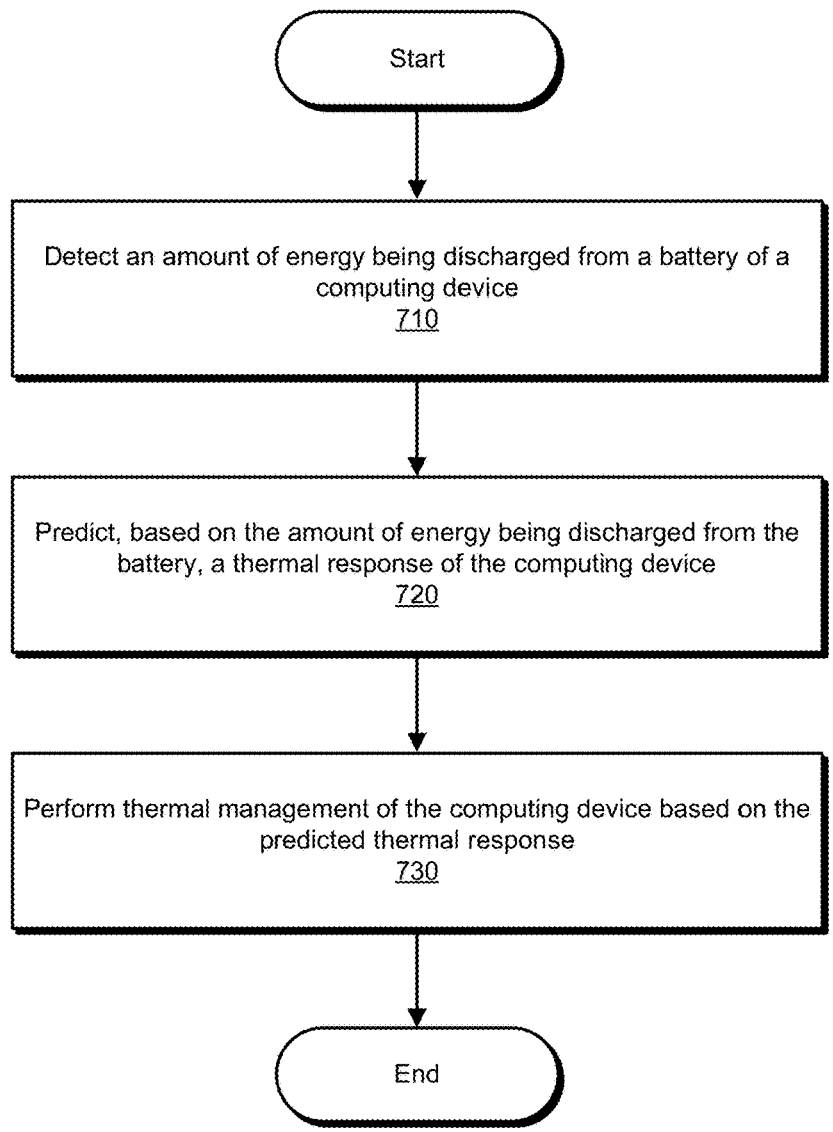
FIG. 7 is a flow diagram of an exemplary method of energy flow integration for a predictive virtual thermal sensor.

FIG. 7 is a flow diagram of an exemplary computer-implemented method 700 for energy flow integration for a predictive virtual thermal sensor. The steps shown in FIG. 7 may be performed by any suitable computer-executable code and/or computing system, including the system(s) illustrated in FIGS. 4 and/or 6. In one example, each of the steps shown in FIG. 7 may represent an algorithm whose structure includes and/or is represented by multiple sub-steps, examples of which will be provided in greater detail below.

As illustrated in FIG. 7, at step 710 one or more of the systems described herein may detect an amount of energy being discharged from a battery of a computing device. For example, device 600 may detect an amount of energy being discharged from its battery.

The systems described herein may perform step 710 in a variety of ways. In one example, the amount of energy being discharged from the battery may be detected via an accumulator circuit coupled to the battery.

In some examples, detecting the amount of energy being discharged may include determining how much of the energy being discharged from the battery is being converted to a wireless communication signal. The determination of how much of the energy is being converted to the wireless communication signal may be performed based on transmission data from a transmit byte counter.

In some examples, detecting the amount of energy being discharged may include determining how much of the energy being discharged from the battery is being converted to heat energy.

In some examples, detecting the amount of energy being discharged may include determining how much of the heat energy is being dissipated.

At step 720 one or more of the systems described herein may predict, based on the amount of energy being discharged from the battery, a thermal response of the computing device. For example, device 600 may predict its thermal response based on the amount of energy detected at step 710.

The systems described herein may perform step 720 in a variety of ways. In one example, predicting the thermal response may account for the various types of energy considered in step 710. In some examples, predicting the thermal response may account for the energy that is being converted to the wireless communication signal. In some examples, predicting the thermal response may account for the heat energy.

At step 730 one or more of the systems described herein may perform thermal management of the computing device based on the predicted thermal response. For example, device 600 may perform thermal management based on the predicted thermal response.

The systems described herein may perform step 730 in a variety of ways. In one example, performing thermal management may include throttling the computing device when the predicted thermal response indicates a rising temperature.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
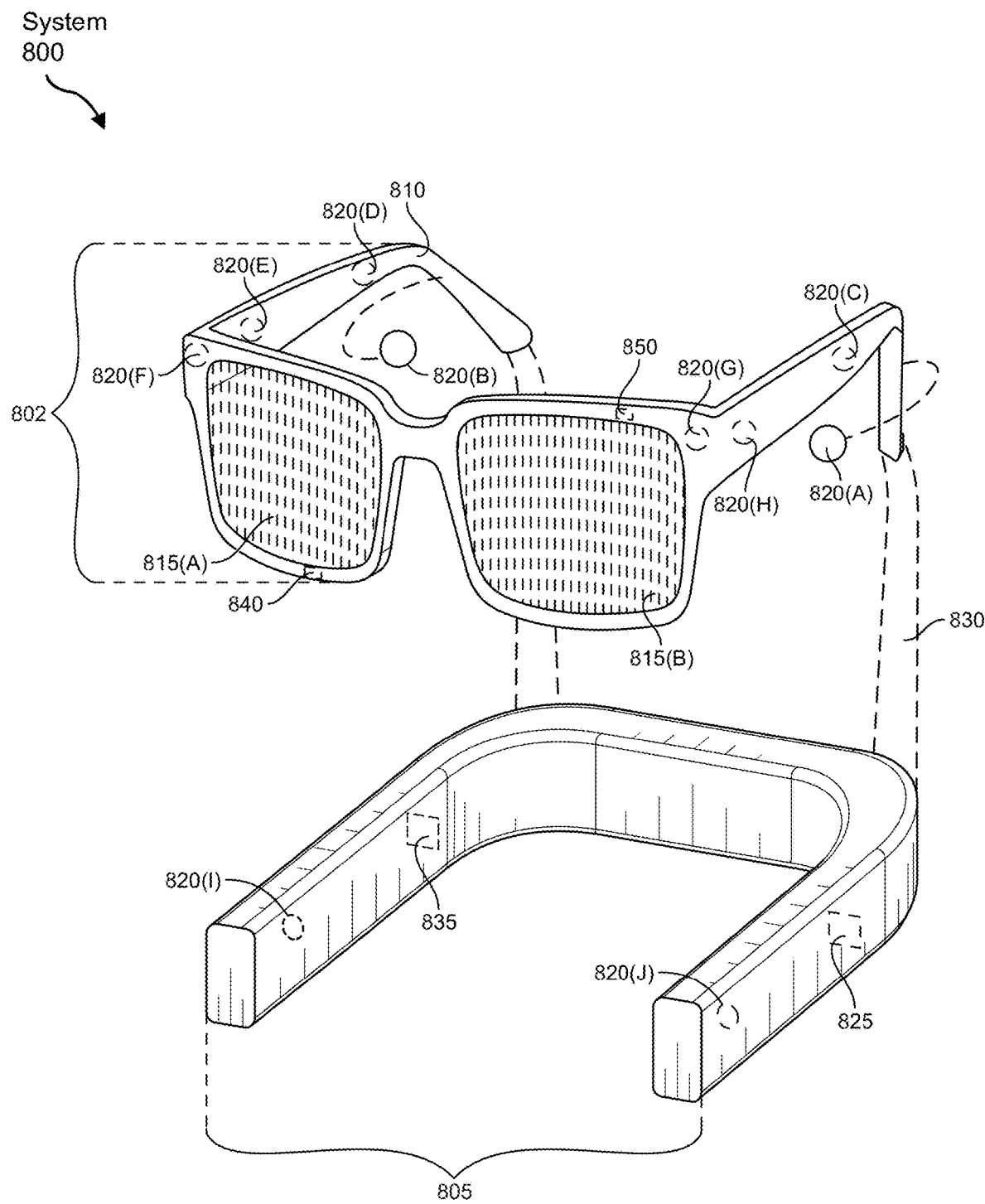
FIG. 8 is an illustration of exemplary augmented-reality glasses that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCOS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 800 and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
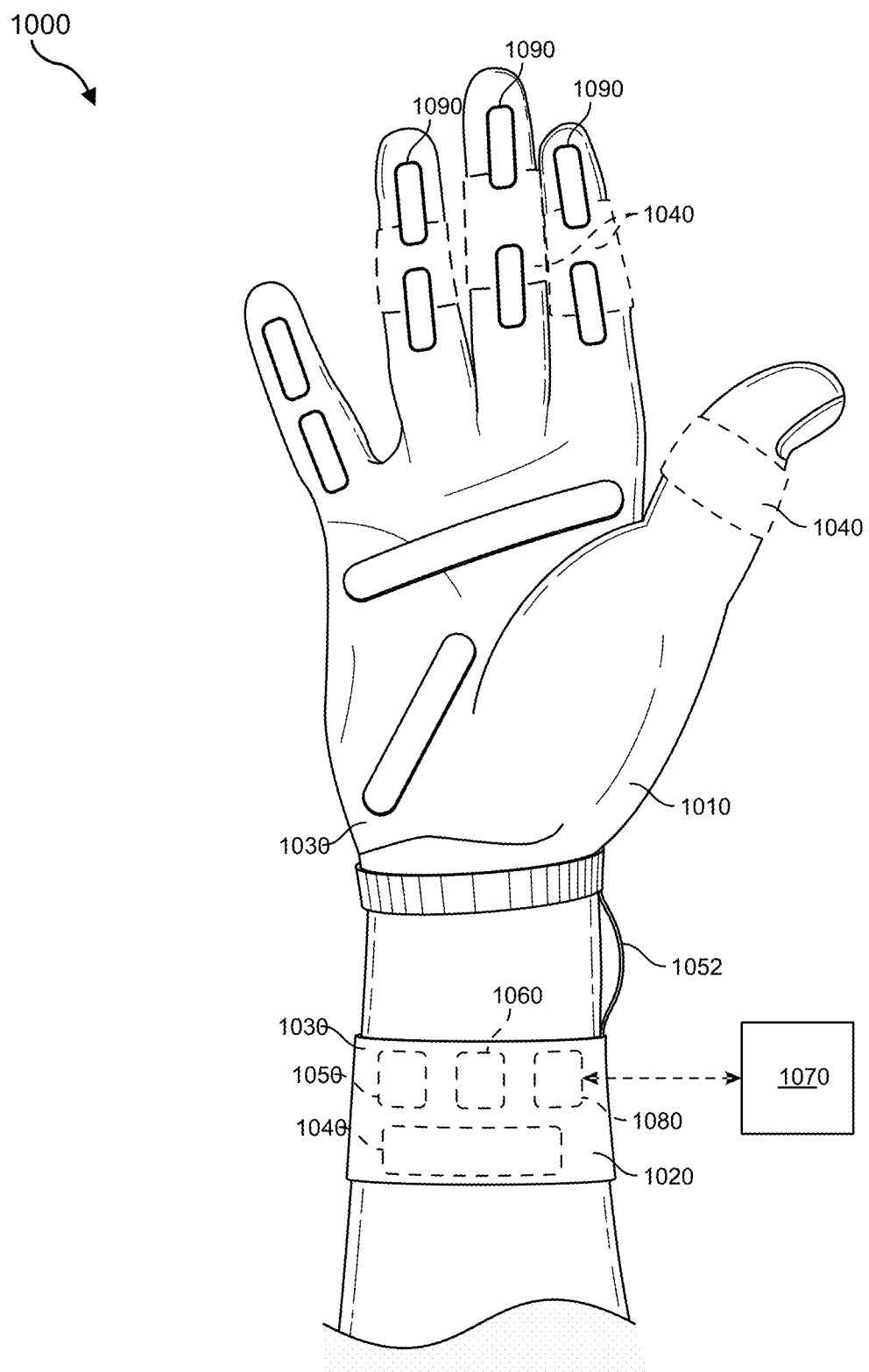
FIG. 10 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070. For example, vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, BLUETOOTH, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
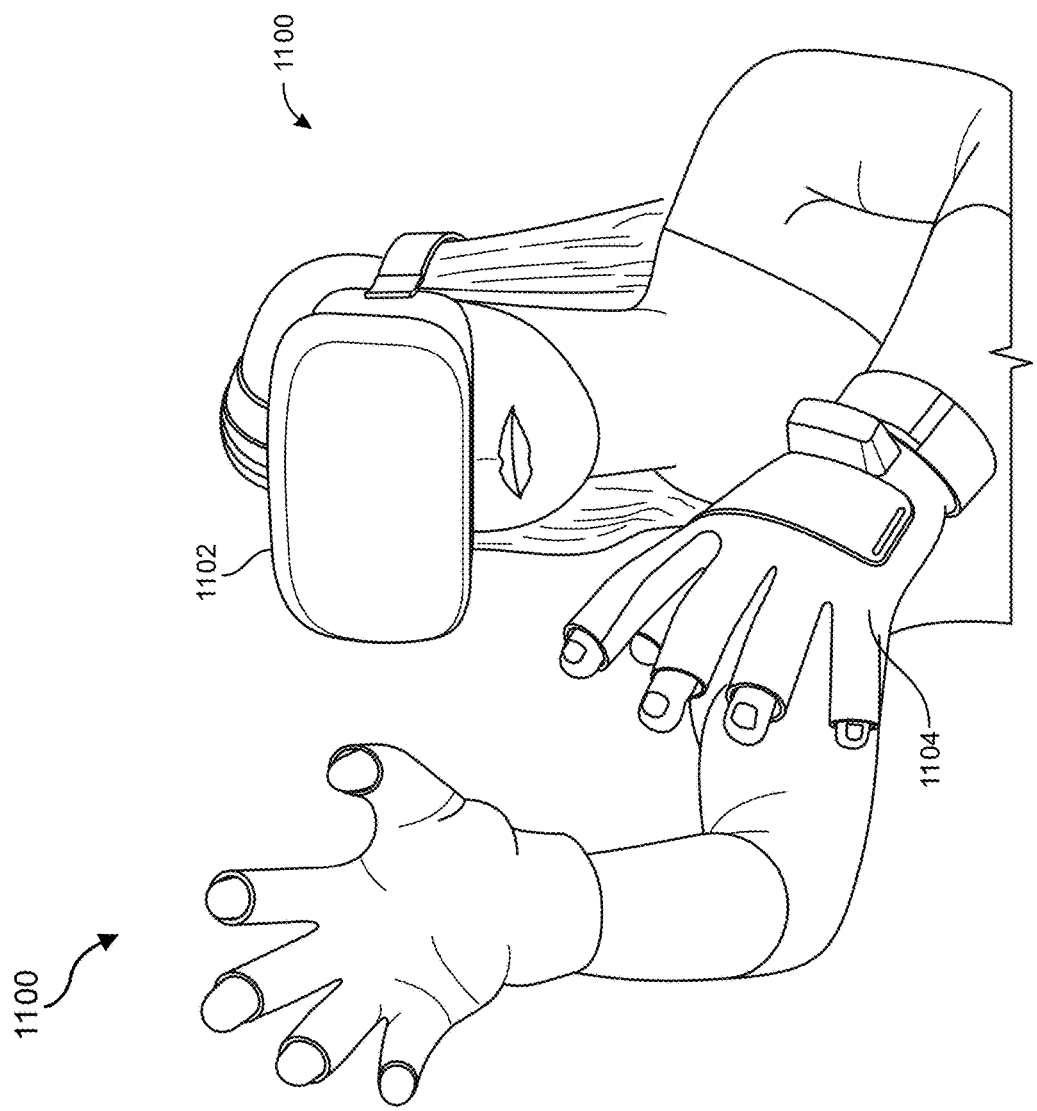
FIG. 11 is an illustration of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 9:
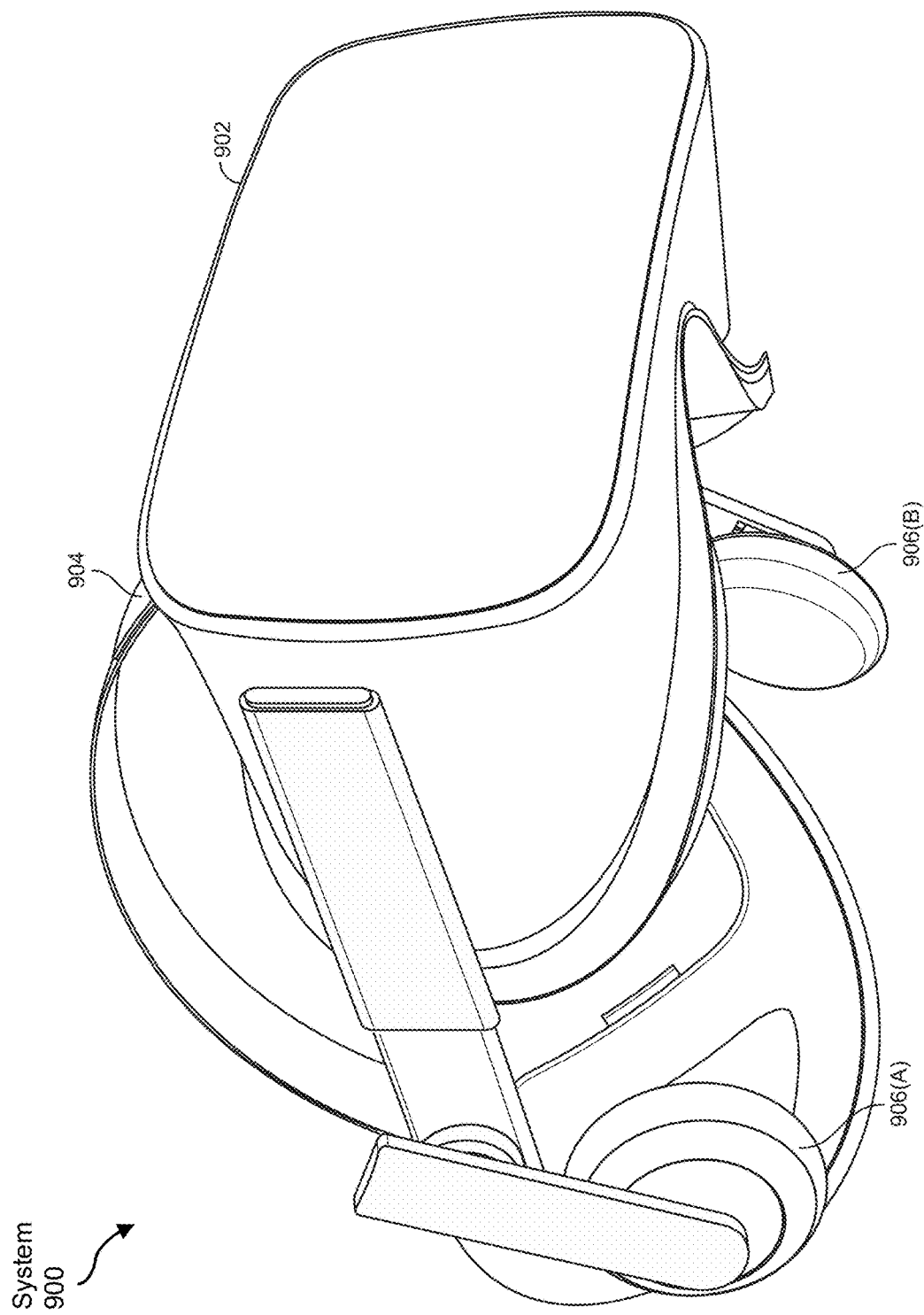
FIG. 9 is an illustration of an exemplary virtual-reality headset that may be used in connection with embodiments of this disclosure.

Head-mounted display 1102 generally represents any type or form of virtual-reality system, such as virtual-reality system 900 in FIG. 9. Haptic device 1104 generally represents any type or form of wearable device, worn by a user of an artificial-reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
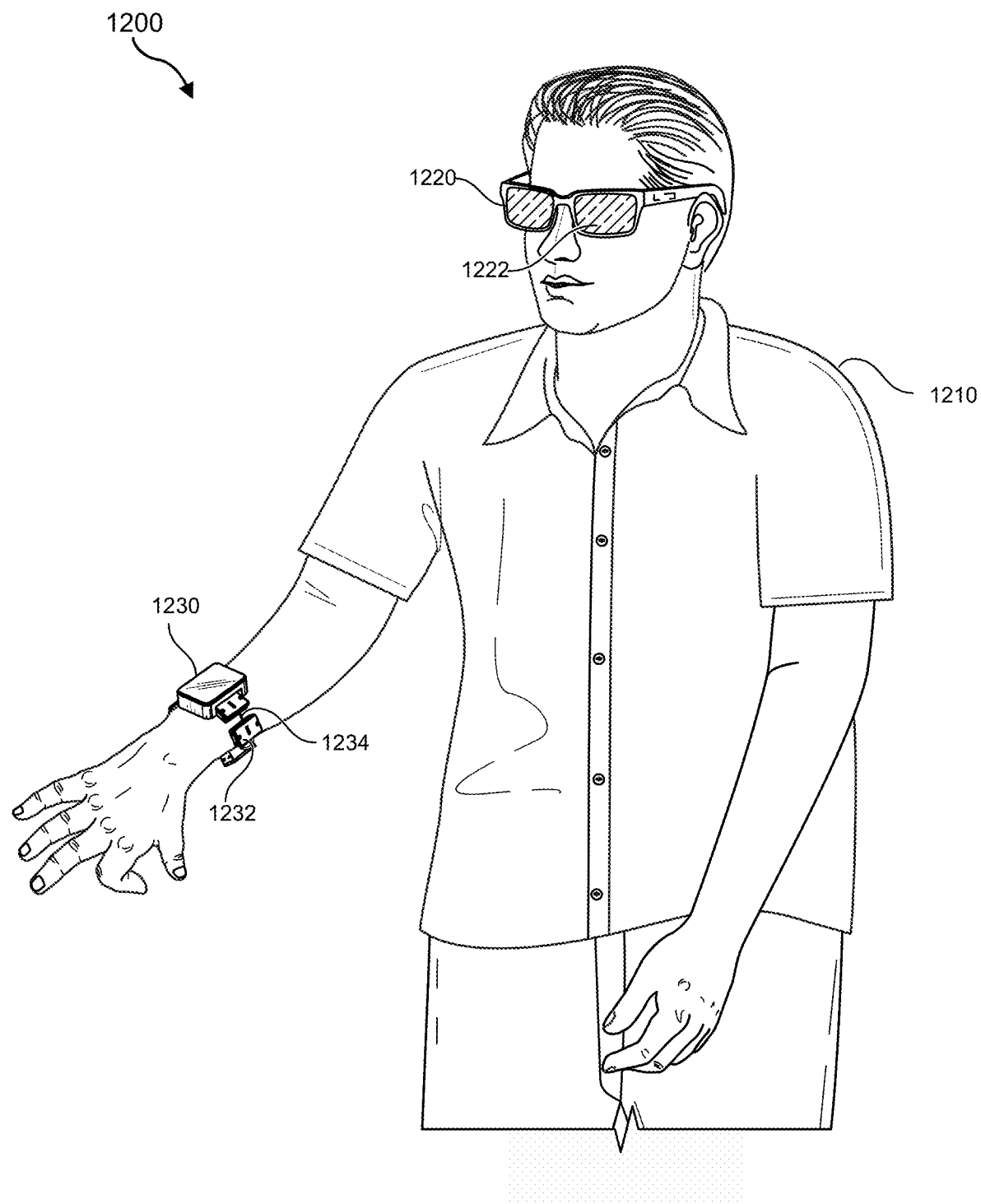
FIG. 12 is an illustration of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

Figure 13A:
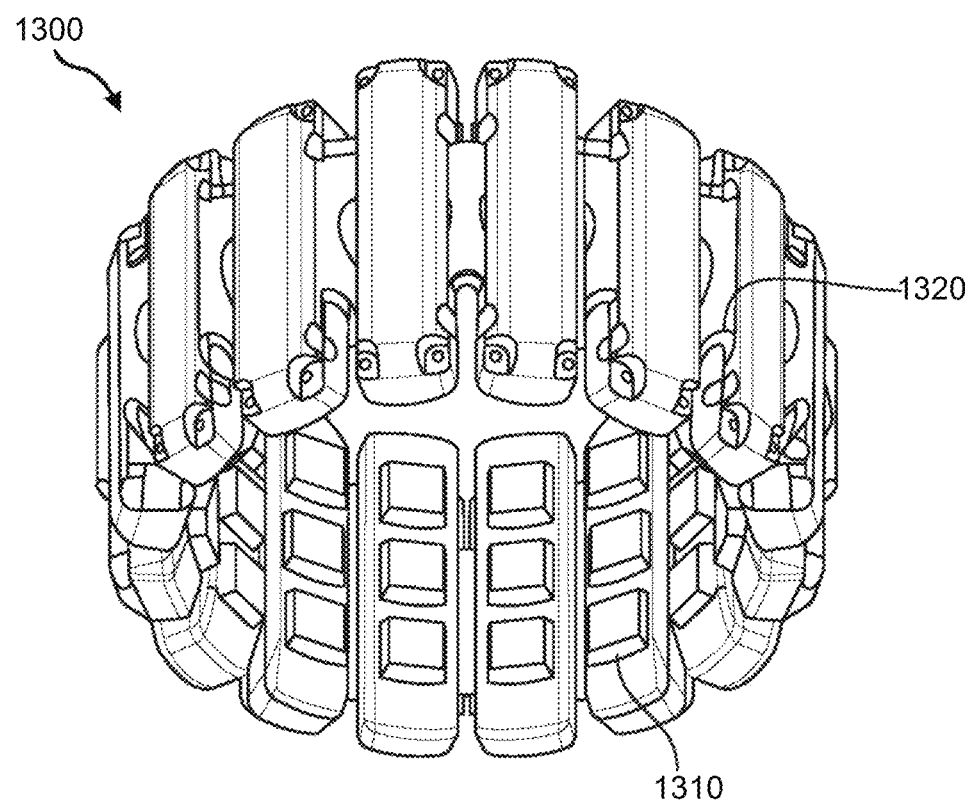
FIGS. 13A and 13B are illustrations of an exemplary human-machine interface configured to be worn around a user's lower arm or wrist.
Figure 13B:
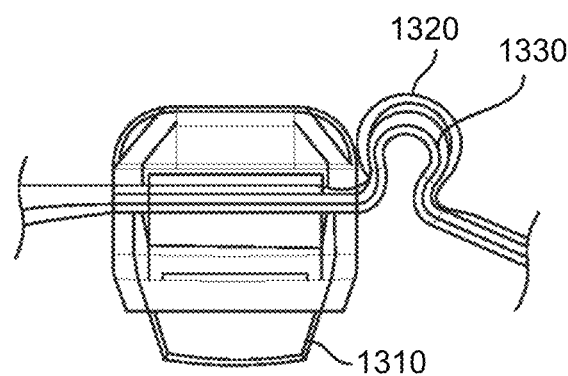

FIG. 13A illustrates an exemplary human-machine interface (also referred to herein as an EMG control interface) configured to be worn around a user's lower arm or wrist as a wearable system 1300. In this example, wearable system 1300 may include sixteen neuromuscular sensors 1310 (e.g., EMG sensors) arranged circumferentially around an elastic band 1320 with an interior surface 930 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 13B illustrates a cross-sectional view through one of the sensors of the wearable device shown in FIG. 13A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1310 is discussed in more detail below with reference to FIGS. 14A and 14B.

Figure 14A:
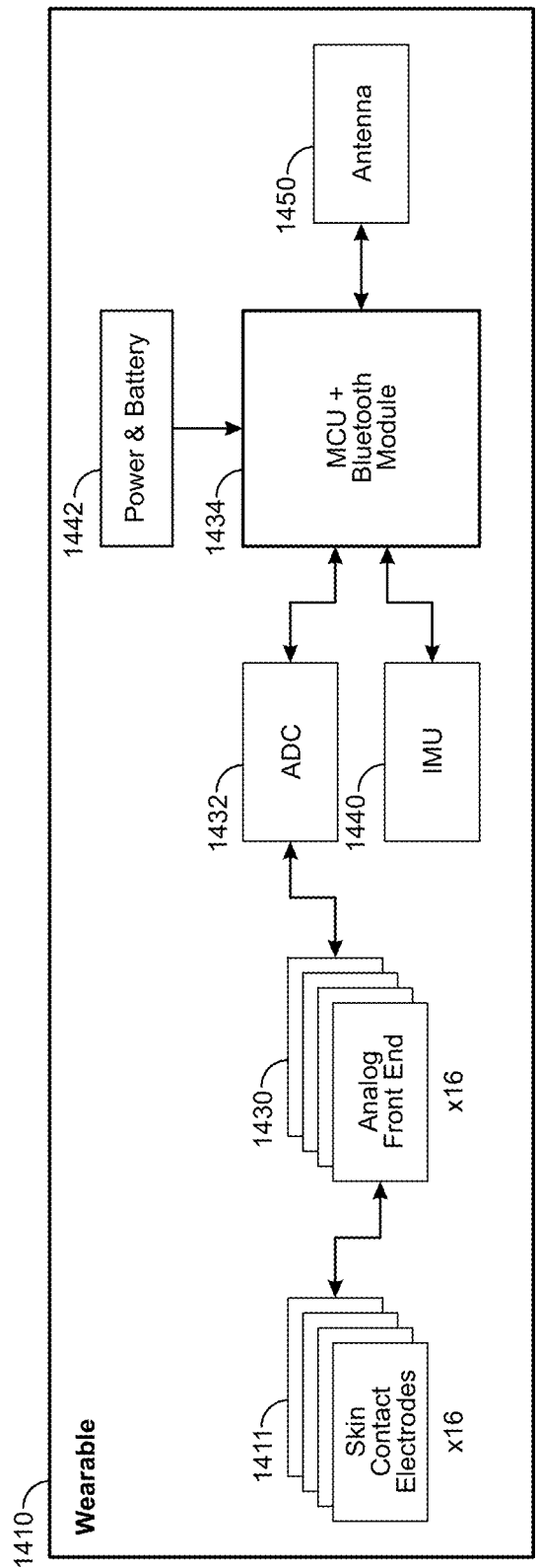
FIGS. 14A and 14B are illustrations of an exemplary schematic diagram with internal components of a wearable system.
Figure 14B:
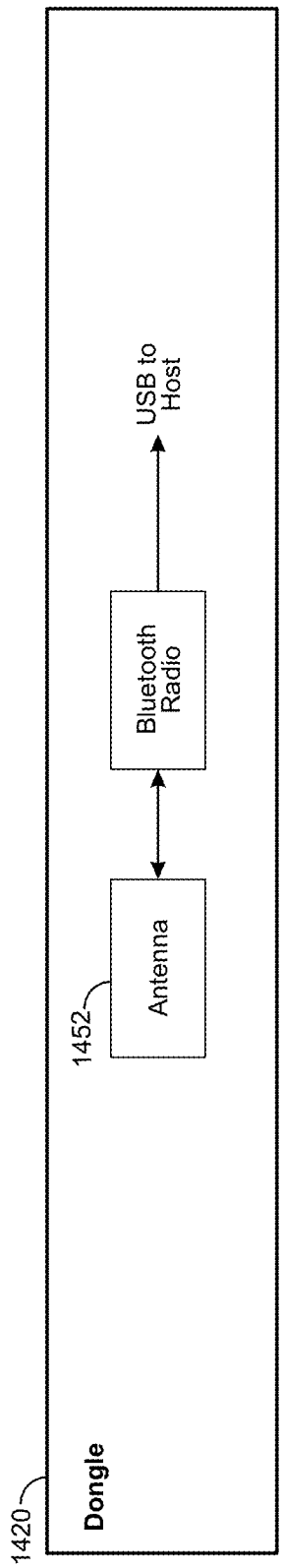

FIGS. 14A and 14B illustrate an exemplary schematic diagram with internal components of a wearable system with EMG sensors. As shown, the wearable system may include a wearable portion 1410 (FIG. 14A) and a dongle portion 1420 (FIG. 14B) in communication with the wearable portion 1410 (e.g., via BLUETOOTH or another suitable wireless communication technology). As shown in FIG. 14A, the wearable portion 1410 may include skin contact electrodes 1411, examples of which are described in connection with FIGS. 13A and 13B. The output of the skin contact electrodes 1411 may be provided to analog front end 1430, which may be configured to perform analog processing (e.g., amplification, noise reduction, filtering, etc.) on the recorded signals. The processed analog signals may then be provided to analog-to-digital converter 1432, which may convert the analog signals to digital signals that can be processed by one or more computer processors. An example of a computer processor that may be used in accordance with some embodiments is microcontroller (MCU) 1434, illustrated in FIG. 14A. As shown, MCU 1434 may also include inputs from other sensors (e.g., IMU sensor 1440), and power and battery module 1442. The output of the processing performed by MCU 1434 may be provided to antenna 1450 for transmission to dongle portion 1420 shown in FIG. 14B.

Dongle portion 1420 may include antenna 1452, which may be configured to communicate with antenna 1450 included as part of wearable portion 1410. Communication between antennas 1450 and 1452 may occur using any suitable wireless technology and protocol, non-limiting examples of which include radiofrequency signaling and BLUETOOTH. As shown, the signals received by antenna 1452 of dongle portion 1420 may be provided to a host computer for further processing, display, and/or for effecting control of a particular physical or virtual object or objects.

Although the examples provided with reference to FIGS. 13A-13B and FIGS. 14A-14B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive accumulator data to be transformed, transform the accumulator data, output a result of the transformation to predict a thermal response, use the result of the transformation to perform thermal management, and store the result of the transformation to manage the thermal response. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting an inflow amount of energy being discharged from a battery of a computing device;
   predicting, based on the inflow amount of energy being discharged from the battery, a thermal response of the computing device that includes a cumulative outflow amount of energy that is dissipated through heat, light, and radio waves of one or more components of the computing device; and
   performing thermal management of the computing device based on the predicted thermal response according to a difference between the cumulative inflow amount of energy and the cumulative outflow energy.

2. The method of claim 1, wherein the amount of energy being discharged from the battery is detected via an accumulator circuit coupled to the battery.

3. The method of claim 1, further comprising determining how much of the energy being discharged from the battery is being converted to a wireless communication signal, wherein predicting the thermal response accounts for the energy that is being converted to the wireless communication signal.

4. The method of claim 3, wherein the determination of how much of the energy is being converted to the wireless communication signal is performed based on transmission data from a transmit byte counter.

5. The method of claim 1, further comprising determining how much of the energy being discharged from the battery is being converted to heat energy, wherein predicting the thermal response accounts for the heat energy.

6. The method of claim 5, further comprising determining how much of the heat energy is being dissipated.

7. The method of claim 1, wherein performing thermal management further comprises throttling the computing device when the predicted thermal response indicates a rising temperature.

8. A system comprising:
   at least one physical processor;
   physical memory comprising computer-executable instructions that, when executed by the physical processor, cause the physical processor to:
   detect an inflow amount of energy being discharged from a battery of a computing device;
   predict, based on the inflow amount of energy being discharged from the battery, a thermal response of the computing device that includes a cumulative outflow amount of energy that is dissipated through heat, light, and radio waves of one or more components of the computing device; and
   perform thermal management of the computing device based on the predicted thermal response according to a difference between the cumulative inflow amount of energy and the cumulative outflow energy.

9. The system of claim 8, wherein the amount of energy being discharged from the battery is detected via an accumulator circuit coupled to the battery.

10. The system of claim 8, further comprising determining how much of the energy being discharged from the battery is being converted to a wireless communication signal, wherein predicting the thermal response accounts for the energy that is being converted to the wireless communication signal.

11. The system of claim 10, wherein the determination of how much of the energy is being converted to the wireless communication signal is performed based on transmission data from a transmit byte counter.

12. The system of claim 8, further comprising determining how much of the energy being discharged from the battery is being converted to heat energy, wherein predicting the thermal response accounts for the heat energy.

13. The system of claim 12, further comprising determining how much of the heat energy is being dissipated.

14. The system of claim 8, wherein performing thermal management further comprises throttling the computing device when the predicted thermal response indicates a rising temperature.

15. A non-transitory computer-readable medium comprising one or more computer-executable instructions that, when executed by at least one processor of a computing device, cause the computing device to:
   detect an inflow amount of energy being discharged from a battery of a computing device;
   predict, based on the inflow amount of energy being discharged from the battery, a thermal response of the computing device that includes a cumulative outflow amount of energy that is dissipated through heat, light, and radio waves of one or more components of the computing device; and
   perform thermal management of the computing device based on the predicted thermal response according to a difference between the cumulative inflow amount of energy and the cumulative outflow energy.

16. The non-transitory computer-readable medium of claim 15, wherein the amount of energy being discharged from the battery is detected via an accumulator circuit coupled to the battery.

17. The non-transitory computer-readable medium of claim 15, further comprising determining how much of the energy being discharged from the battery is being converted to a wireless communication signal, wherein predicting the thermal response accounts for the energy that is being converted to the wireless communication signal.

18. The non-transitory computer-readable medium of claim 17, wherein the determination of how much of the energy is being converted to the wireless communication signal is performed based on transmission data from a transmit byte counter.

19. The non-transitory computer-readable medium of claim 15, further comprising determining how much of the energy being discharged from the battery is being converted to heat energy, wherein predicting the thermal response accounts for the heat energy.

20. The non-transitory computer-readable medium of claim 19, further comprising determining how much of the heat energy is being dissipated.

* * * * *